(12) United States Patent
Dennison et al.

(10) Patent No.: US 8,205,504 B2
(45) Date of Patent: Jun. 26, 2012

(54) MICRON-SCALE PRESSURE SENSORS AND USE THEREOF

(75) Inventors: Christopher Raymond Dennison, Victoria (CA); Peter Martin Wild, Victoria (CA)

(73) Assignee: UVic Industry Partnerships Inc., Victoria, B.C. (CA)

( * ) Notice: Subject to any disclaimer, the term of this patent is extended or adjusted under 35 U.S.C. 154(b) by 0 days.

(21) Appl. No.: 12/993,813

(22) PCT Filed: May 21, 2009

(86) PCT No.: PCT/CA2009/000701
§ 371 (c)(1),
(2), (4) Date: Jan. 28, 2011

(87) PCT Pub. No.: WO2009/140767
PCT Pub. Date: Nov. 26, 2009

(65) Prior Publication Data
US 2011/0120226 A1    May 26, 2011

Related U.S. Application Data

(60) Provisional application No. 61/055,879, filed on May 23, 2008.

(51) Int. Cl.
*G01L 9/00* (2006.01)
*G02B 6/10* (2006.01)
(52) U.S. Cl. ............. 73/705; 356/32; 356/35.5; 385/12; 385/13
(58) Field of Classification Search ............. 73/700–756
See application file for complete search history.

(56) References Cited

U.S. PATENT DOCUMENTS

| | | | |
|---|---|---|---|
| 4,988,212 A | | 1/1991 | Sun et al. |
| 6,337,737 B1* | | 1/2002 | Chang et al. ..................... 356/32 |
| 6,396,572 B1* | | 5/2002 | Chang et al. ................. 356/35.5 |
| 6,580,511 B1* | | 6/2003 | Discenzo ....................... 356/477 |
| 7,003,184 B2 | | 2/2006 | Ronnekleiv et al. |
| 7,196,318 B2 | | 3/2007 | Shin et al. |
| 2004/0182166 A1* | | 9/2004 | Jones et al. ................. 73/729.1 |
| 2004/0237648 A1 | | 12/2004 | Jones et al. |
| 2005/0263281 A1* | | 12/2005 | Lovell et al. ................ 166/255.1 |
| 2006/0062510 A1* | | 3/2006 | Arias Vidal et al. ............ 385/13 |
| 2007/0147738 A1 | | 6/2007 | Wang et al. |
| 2009/0092351 A1* | | 4/2009 | Goldner et al. .................. 385/12 |
| 2010/0018703 A1* | | 1/2010 | Lovell et al. ................ 166/255.2 |
| 2011/0058768 A1* | | 3/2011 | Swinehart et al. ............. 385/13 |

OTHER PUBLICATIONS

International Search Report and Written Opinion for PCT/CA2009/000701, dated Aug. 6, 2009, 8 pages.

* cited by examiner

*Primary Examiner* — Andre Allen
(74) *Attorney, Agent, or Firm* — Klarquist Sparkman, LLP

(57) ABSTRACT

An optical fiber sensing device for detecting physical parameters such as pressures, strains and temperatures comprises a probe housing therein an optical fiber. The distal end of the probe houses a distal portion of the optical fiber having a section provided with a fiber Bragg grating. The proximal end of the probe is mounted into a holder. The optical fiber is sealably mounted into the probe housing with a first seal overlaid the proximal portion of the optical fiber The seal may extend to about the proximal end of the optical fiber section with the Bragg grating. A second seal is overlaid the distal portion of the optical fiber and extends from the distal end of the probe to about the distal end of the optical fiber section with the Bragg grating. The proximal end of the probe is communicable with a fiber Bragg grating interrogation system.

22 Claims, 11 Drawing Sheets

MICRON-SCALE PRESSURE SENSORS AND USE THEREOF

CROSS REFERENCE TO RELATED APPLICATIONS

This is the U.S. National Stage of International Application No. PCT/CA2009/000701, filed May 21, 2009, which was published in English under PCT Article 21(2), which in turn claims the benefit of U.S. Provisional Application No. 61/055,879, filed May 23, 2008.

TECHNICAL FIELD

The present invention relates to pressure sensors for detecting physical parameters. More specifically the technology relates to pressure sensors having etched components with in-fibre Bragg gratings (FBGs).

BACKGROUND ART

In-fibre Bragg gratings (FBGs) have been used extensively as sensors for various parameters including displacement, strain, temperature, pressure, humidity, and radiation dose. FBGs are attractive alternatives to other piezoelectric, resistive or other solid-state sensing technologies because they are small, typically 125 μm in diameter, mechanically compliant, intrinsically robust, chemically inert, resistant to corrosive environments, immune to electromagnetic interference and when suitably configured, are capable of simultaneous multi-parameter sensing.

FBGs have been minimally adapted for medical pressure measurement applications, largely because bare FBGs exhibit low sensitivities to hydrostatic pressures, and their resolution of pressure variations is on the order of MPa. Various mechanical amplification schemes have been developed to increase the sensitivity of FBGs to pressure. Such schemes included application of polymer coatings onto the fibre circumference, or alternatively, onto the pressure diaphragms. The pressure sensitivity of such modified FBGs is increased because the strain caused by a pressure applied to a coated fibre Bragg grating (FBG) is amplified relative to uncoated i.e., bare FBG. Other FBGs modification strategies include housing FBGs in glass-bubbles (e.g., 4-mm diameter). The problem with these types of FBG modification strategies is that because of the increased physical dimensions of coated FBG and housed FBG sensing regions, they do not retain the intrinsic benefits of uncoated FBG technologies, i.e., small size, spatial resolution and mechanical compliance.

The prior art also includes FBG sensors configured for invasive medical assessments, wherein a sensor comprises an optical fibre, a sensing location at which the fibre is configured to provide at least one detectable changeable optical property responsive to a strain within the fibre, and at least one sensing element that undergoes a volumetric change in response to an in-body physical parameter being detected. The sensing element is coupled to the fibre in such a way that volumetric changes induce the strain modulations within the fibre thereby producing detectable variable optical properties. One such sensor employs as a sensing element, a FBG encased in a thick polymer coating such as a hydrogel. The polymer coating amplifies the magnitude of strain on the fibre when the sensor is exposed to a pressure on its outer cylindrical surface. However, due to their increased over-all physical dimensions, coated FBG are more invasive when used for medical applications.

SUMMARY OF THE INVENTION

The exemplary embodiments of the present invention relate to pressure sensing devices comprising optical fibres having FBGs.

An exemplary pressure sensing device comprises an optical fibre sealed into a probe-type housing. The distal portion of the probe detects pressures. The proximal portion of the probe is mounted into a holder. The probe may be releasably mounted into the holder. A section of the optical fibre housed within the distal sensing portion of the probe has a FBG. The optical fibre is sealed within the probe with a first seal extending along the proximal portion of the probe that terminates about the proximal end of the optical fibre section with the FBG. A second seal extends from the distal terminal end of the probe to about the distal end of the optical fibre section with the FBG. A compliant material that deflects due to applied pressure is sealably mounted to the distal terminal end of the probe thereby covering the housing orifice. The distal terminal end of the optical fibre communicates with the pressure-sensing material. The optical fibre section with the FBG is not overlaid with a seal. Consequently, this section of the optical fibre is suspended within the probe housing and is surrounded by an airspace. A vacuum may optionally be applied to this airspace, or alternatively, the airspace may be filled with a suitable selected gas The proximal end of the probe is communicable with a FBG interrogation system.

According to one aspect, the FBG is situated on a section of the optical fibre that is set back from the distal terminal end of the probe. In this configuration, the optical fibre section with the FBG may be situated anywhere along the optical fibre that is within the proximal and is situated in the suspended portion of the fibre of the distal portion of the probe. In this configuration, the second seal generally extends about the optical fibre from the distal terminal end of the probe to about the distal end of the optical fibre section with the FBG.

According to another aspect, the FBG is situated on a section of the optical fibre adjacent to the distal terminal end of the probe. In this configuration, the optical fibre section with the FBG is situated along the optical fibre that is within the distal area of the distal portion of the probe. In this configuration, the width of the second seal is sufficient to secure the distal terminal end of the optical fibre within the probe housing while concurrently maintaining separation between the optical fibre and the housing.

An exemplary embodiment of the present invention relates to pressure sensing devices comprising optical fibres with narrowed-diameter sections having FBGs. A selected FBG configuration is installed onto a section of an exemplary optical fibre and then narrowed to a selected diameter by a process exemplified by chemical etching. An exemplary pressure sensing device according to this embodiment of the present invention comprises an optical fibre with a narrowed diameter section provided with a FBG, installed into a probe housing wherein the narrowed diameter section is positioned along the distal portion of the probe. The optical fibre is sealed within the probe with a first seal extending along the proximal portion of the probe that terminates about the proximal end of the optical fibre section with the FBG. A second seal extends from the distal terminal end of the probe to about the distal end of the optical fibre section with the FBG. A compliant material that deflects due to applied pressure is sealably mounted to the distal terminal end of the probe thereby covering the housing orifice. The distal terminal end of the optical fibre communicates with the pressure-sensing material. The narrowed-diameter section of the optical fibre with the FBG, is not overlaid with a seal but rather, is surrounded by an airspace. The proximal portion of the probe is mounted into a suitable holder. The probe may be releasibly mounted.

A suitable diameter of an optical fibre for installation into a probe according to the exemplary embodiments of the present invention is about 400 microns and less. Particularly suitable optical fibres are those with diameters of about 125 microns and less.

The exemplary pressure sensing devices of the present invention may be configured for sensing and measuring pressures in industrial applications exemplified by structural monitoring of buildings, roadworks, coverings and/or shells and/or structural components of equipment operating in high-stress environments. Some exemplary pressure sensing devices of the present invention may be configured for non-invasive and/or minimally invasive biomedical applications.

BRIEF DESCRIPTION OF THE DRAWINGS

The present invention will be described in conjunction with reference to the following drawings in which.

DETAILED DESCRIPTION OF THE INVENTION

Figure 1:
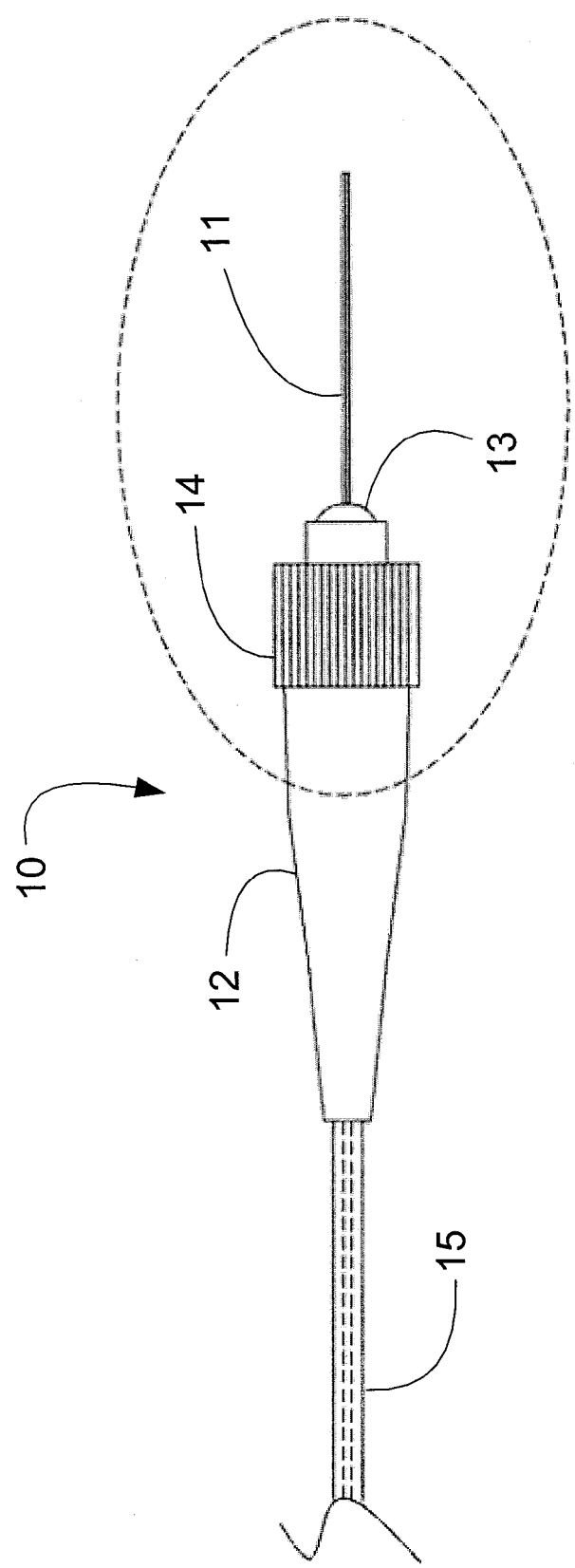
FIG. 1 is a schematic view of an exemplary sensing device of the present invention.

As used herein, "structural finite-element" refers to a mathematical technique originally developed for numerical solution of complex problems in structural mechanics, and it remains the method of choice for complex systems. The structural finite element method enables calculations of approximate solutions of partial differential equations (PDE) as well as of integral equations. The solution approach is based on either eliminating the differential equation completely (steady state problems), or rendering the PDE into an approximating system of ordinary differential equations, which are then numerically integrated using standard techniques such as Euler's method, Runge-Kutta and the like. The primary challenge in solving partial differential equations, is to create an equation that approximates the equation to be studied, but is numerically stable, meaning that errors in the input data and intermediate calculations do not accumulate thereby causing the resulting outputs to be meaningless. Commonly used mathematical options include the Finite Element Method for solving partial differential equations over complex domains, or when the domain changes (e.g., during a solid state reaction with a moving boundary), or when the desired precision varies over the entire domain, or when the solution lacks smoothness.

As used herein "Young's modulus" refers to tensile elasticity, or the tendency of an object to deform along an axis when opposing forces are applied along that axis; it is defined as the ratio of tensile stress to tensile strain.

As used herein "Poisson ratio" refers to the ratio of the contraction or transverse strain (normal to the applied load), to the extension or axial strain (in the direction of the applied load). When a sample cube of a material is stretched in one direction, it tends to contract (or occasionally, expand) in the other two directions perpendicular to the direction of stretch. Conversely, when a sample of material is compressed in one direction, it tends to expand (or rarely, contract) in the other two directions. This phenomenon is called the Poisson effect.

An exemplary pressure sensing device according to the present invention comprises an optical fibre sealed into a probe-type housing. The distal portion of the probe detects pressures. The proximal portion of the probe is mounted into a holder. The probe may be releasibly mounted into the holder. A suitable diameter for the optical fibre is about 400 microns and less. Particularly suitable are optical fibres having diameters of about 350 microns and less. A section of the optical fibre housed within the distal sensing portion of the probe is provided with a FBG. The optical fibre is sealed within the probe with a first seal extending along the proximal portion of the probe that terminates about the proximal end of the optical fibre section with the FBG. A second seal extends from the distal terminal end of the probe to about the distal end of the optical fibre section with the FBG. A compliant material that deflects due to applied pressure is sealably mounted to the distal terminal end of the probe thereby covering the housing orifice. The distal terminal end of the optical fibre communicates with the compliant material that deflects due to applied pressure. The optical fibre section with the FBG is not overlaid with a seal. Consequently, this section of the optical fibre is suspended within the probe housing and is surrounded by an airspace. If so desired, the airspace may be saturated with a selected gas. The proximal end of the probe is communicable with a FBG interrogation system.

In some embodiments, the FBG is situated on a section of the optical fibre that is set back from the distal terminal end of the probe. In this configuration, the optical fibre section with the FBG may be situated anywhere along the optical fibre that is within the proximal and middle areas of the distal portion of the probe. In this configuration, the second seal generally extends about the optical fibre from the distal terminal end of the probe to about the distal end of the optical fibre section with the FBG.

In some embodiments, the FBG is situated on a section of the optical fibre adjacent to the distal terminal end of the probe. In this configuration, the optical fibre section with the FBG is situated along the optical fibre that is within the distal area of the distal portion of the probe. In this configuration, the width of the second seal is sufficient to secure the distal terminal end of the optical fibre within the probe housing while concurrently maintaining separation between the optical fibre and the housing.

Other exemplary embodiments of the present invention relate to pressure sensing devices comprising optical fibres with narrowed-diameter sections having fibre Bragg gratings. A FBG configuration is installed on a section of an exemplary optical fibre and then narrowed to a selected diameter by a process exemplified by chemical etching. An exemplary pressure sensing device according to this embodiment of the present invention comprises an optical fibre with a narrowed diameter section provided with a FBG, installed into a probe housing wherein the narrowed diameter section is positioned along the distal portion of the probe. The optical fibre is sealed within the probe with a first seal extending along the proximal portion of the probe that terminates about the proximal end of the optical fibre section with the FBG. A second seal extends from the distal terminal end of the probe to about the distal end of the optical fibre section with the FBG. A compliant material that deflects due to applied pressure is sealably mounted to the distal terminal end of the probe thereby covering the housing orifice. The distal terminal end of the optical fibre communicates with the compliant material that deflects due to applied pressure. The narrowed-diameter section of the optical fibre with the FBG, is not overlaid with a seal but rather, is surrounded by an airspace. The proximal portion of the probe is mounted into a suitable holder. The probe may be releasibly mounted into the holder if so desired.

Some exemplary embodiments relate to methods for designing pressure sensors of the present invention. An exemplary method may comprise a first step wherein a conceptual design is developed for increasing pressure sensitivity amplification without increasing the major diameter of an optical fibre with a FBG therealong. A second step relates to calculation of the pressure sensitivities for the conceptual design using a combination of a structural finite-element (FE) model and a strain-optic mathematical model. A third step relates to the use of the combination mathematical model to estimate and assess the effects on detectable pressure sensitivity, of varying the sizes of several embodiment design features, i.e., achieved by selective precise etching of an optical fibre section whereon is installed a FBG. A suitable approach would be to incrementally vary the sizes of the design features (i.e., the selected etchings) over suitable ranges that could be manufactured, and then re-calculating the strains along the etched FBG for each incremental value of the etching. A fourth step relates to verification of the modeled predictions by constructing at least two etched FBG embodiments and experimentally verifying that the detected sensitivities approximated the modeled predictions. A fifth step relates to the incorporation of design refinements based on the experimental data, into a final design for an optical fibre that comprises a section with a reduced major diameter along its length whereon an FBG is installed and wherein the reduced major diameter section enables increased sensitivity of pressure detection. A final step relates to the estimation of the sensitivity of the final etched FBG sensor with the finite-element/strain-optic mathematical model and then experimentally validating the estimated sensitivity. It is suitable to determine calibration results over a range of applied pressures from about 0 kPa to about 13 kPa, using a fixed filter demodulation technique known to those skilled in these arts.

The exemplary methods of the present invention relate to reducing by selectively etching a section of an optical fibre whereon a FBG is installed, wherein the diameter of the optical fibre is reduced by at least about 1%, alternatively at least by about 10%, optionally by at least about 25%, further optionally by at least about 50% and alternatively, by at least about 80%. An exemplary etched optical fibre section may have a reduced diameter at most of about 25 The outside diameter along the length of the optical fibre may be at most about 400 or optionally at most about 350 µm and alternatively, at most about 150 µm. Such an exemplary etched FBG sensor may have a pressure detection sensitivity of at least about 75 pm/MPa/mm, or optionally at least about 150 pm/MPa/mm, and alternatively at least about 250 pm/MPa.

The exemplary sensing devices of the present invention are suitable for cooperation and communication with FBG interrogation systems wherein increased sensitivities are desired for detection of pressure strains. Suitable applications include among others various civil, structural, and environmental engineering applications. Exemplary sensing devices of the present invention are also suitable for minimally invasive medical applications for detection and measurement of pressure changes in and/or along and/or within cerebrospinal fluid, muscle compartments, blood-vessels arterial stents, and areas of intradiscal, intracranial, intramuscular, intra-articular, and ventricular pressure, and the like.

EXAMPLES

Following are exemplary, but non-limiting examples illustrating embodiments of the present invention.

Example 1

Figure 2:
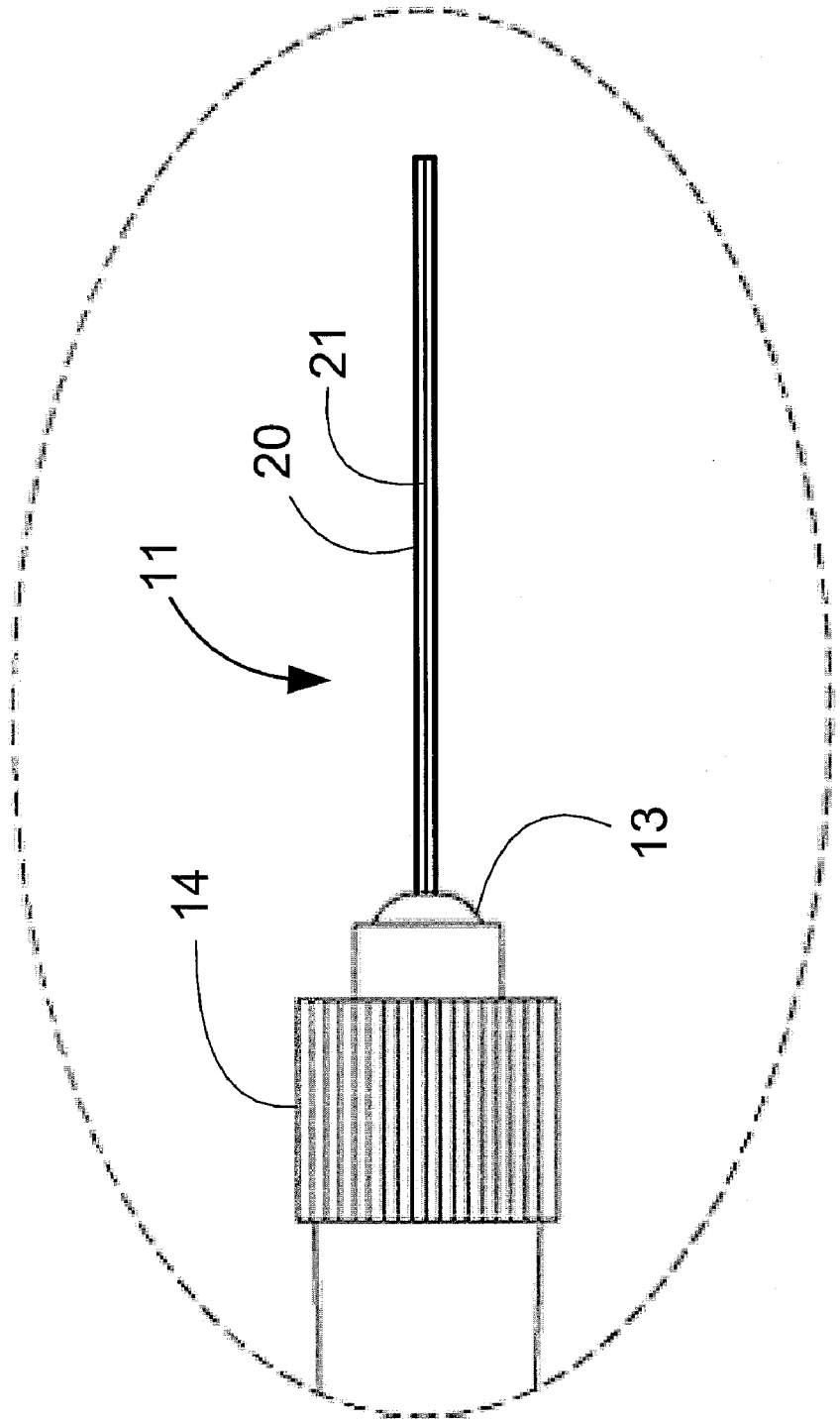
FIG. 2 is a close-view of the distal portion of the probe component of the sensing device shown in FIG. 1.
Figure 3:
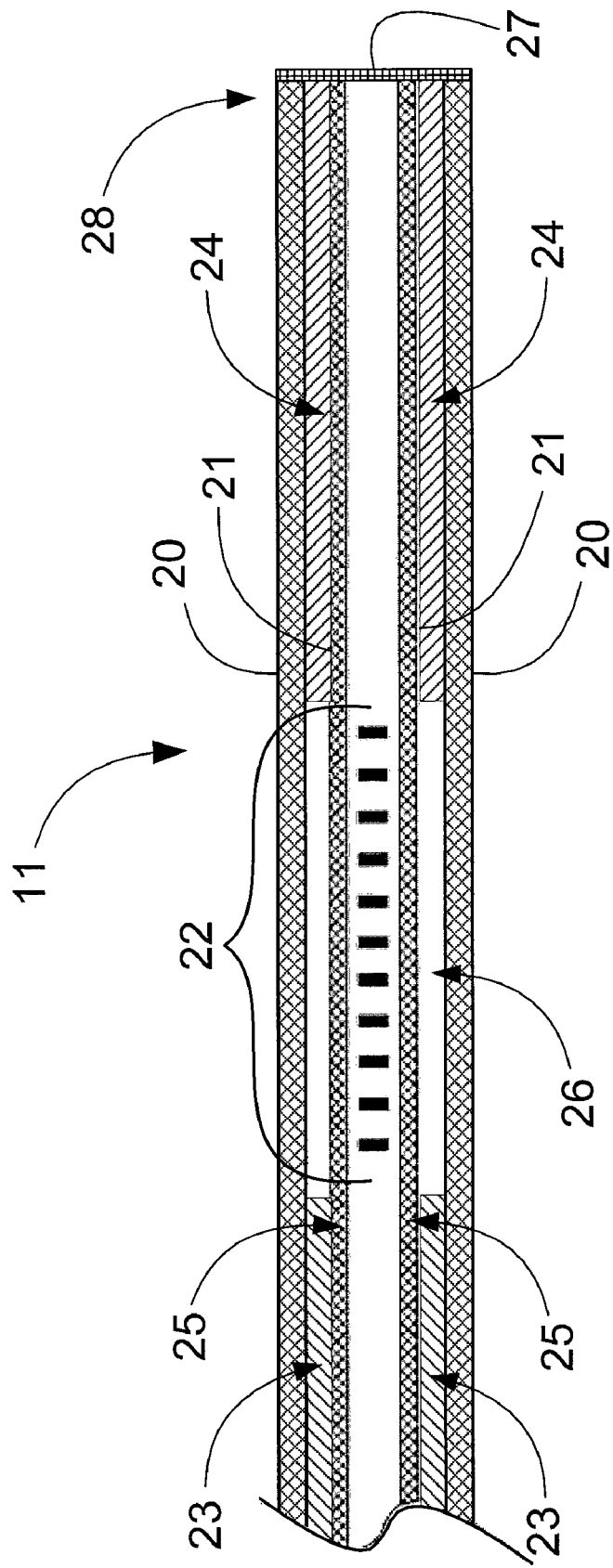
FIG. 3 is a cross-sectional side view through the distal portion of the probe shown in FIG. 2.

An exemplary pressure sensing device 10 is shown in FIGS. 1-3. The proximal portion of the probe component 11 was inserted into a holder 12. The distal portion of the probe 11 was inserted through a grommet 13 which was then positioned into a receiving end of holder and secured in place by a ferrule 14 engaging threads provided therefor on the holder. The probe 11 was a housing 20 comprising a stainless steel hypodermic tube (0.4 mm outside diameter; 0.1 mm wall thickness). A FBG 22 (Blue Road Research, Gresham, Oreg., USA) was UV-written into the core of a single mode optical fibre 21 (SMF-28, Corning Life Sciences, Lowell, Mass., USA) positioned approximate one end of the optical fibre 21 (FIG. 4(a)). The optical fibre 21 was then inserted into the housing 20 until the tip of the optical fibre approximate the FBG 22, was flush with an end of the housing 20. This end was identified as the distal end 28 of the probe 11. The annular volume 26 between the distal end of the optical fibre 21 and the inner diameter of the housing 20, was filled with a silicone sealant 24 (Dow Corning 3140 RTV, The Dow Chemical Co., Midland, Mich., USA) until the silicone was about the distal end of the optical fibre section with the FBG 22. The silicone sealant was manipulated to completely seal the distal end of the housing thereby providing a resiliant and compliant diaphragm 27 that completely covered the distal end of the housing 20. The proximal end of the optical fibre 21 extends out of the probe 11 and into the FBG interrogation system (FIG. 1). The annular volume between the proximal end of the optical fibre 21 and the inner diameter of the housing 20, was filled with a the probe 11 and into the FBG interrogation system (FIG. 1). The annular volume between the proximal end of the optical fibre 21 and the inner diameter of the housing 20, was filled with a rigid adhesive until the rigid adhesive was about the proximal end of the optical fibre section with the FBG 22. The pressure sensing end of this exemplary device 10 was at the distal end of the probe 11 and had a surface area of about 0.03 mm². The length of the probe 11 was 50 mm. The proximal end of the probe 11 was inserted into the orifice provided therefore on a holder 12. The distal end of the probe 11 was inserted through a resilient grommet 13 which was then inserted into the orifice of the holder 12. The resilient grommet 13 was secured into place which in turn, clamped the probe 11 in place, by screwing a ferrule 14 onto the holder via threads provided therefor. One end of a cable 15 was interconnected with the proximal end of the probe 11, while the other end was interconnected to a FBG interrogation system (not shown). While the distal terminal end 28 of the probe 11 was sealed with a silicone sealant to form a terminal distal diaphragm 27, those skilled in these arts will understand that a variety of natural and synthetic polymers are suitable for use as a resilient and compliant diaphragm for the terminal distal end of the probe. The hypodermic tubing comprising the housing 20 had a Young's modulus value of 190 kPa with a Poisson ratio of 0.28. The Young's modulus value of the optical fibre was 70 kPa with a Poisson ratio of 0.17. The Young's modulus value of the silicone sealant was 372 kPa with a Poisson ratio of 0.49.

When the probe 11 of the pressure sensor 10 was exposed to a hydrostatic pressure, the pressure communicated with the housing 20 and the resilient diaphragm 27. Relative to the first and second annular sealant seals 23, 24, the housing 20 was rigid and, thereby shielded the optical fibre 21 from the effects of the pressure acting on the housing 20. The pressure applied to the resilient diaphragm 27 caused strains in the second annular sealant seal 24 and the optical fibre 21. The following measurements were recorded and incorporated into the finite element model described in more detail in Example 3. The length of the optical fibre section with the FBG was termed "$L_G$". The length of the second annular seal 24 which is affected by a physical parameter acting on the resilient diaphragm 27 was termed "$L_S$". The inner diameter of the housing 20 was termed "Dt", while the diameter of the optical fibre 21 was termed "Df". Strains in the FBG 22 induced changes in its Bragg wavelength, $\lambda_B$, the characteristic wavelength of light that is reflected from a FBG.

Example 2

Figure 4:
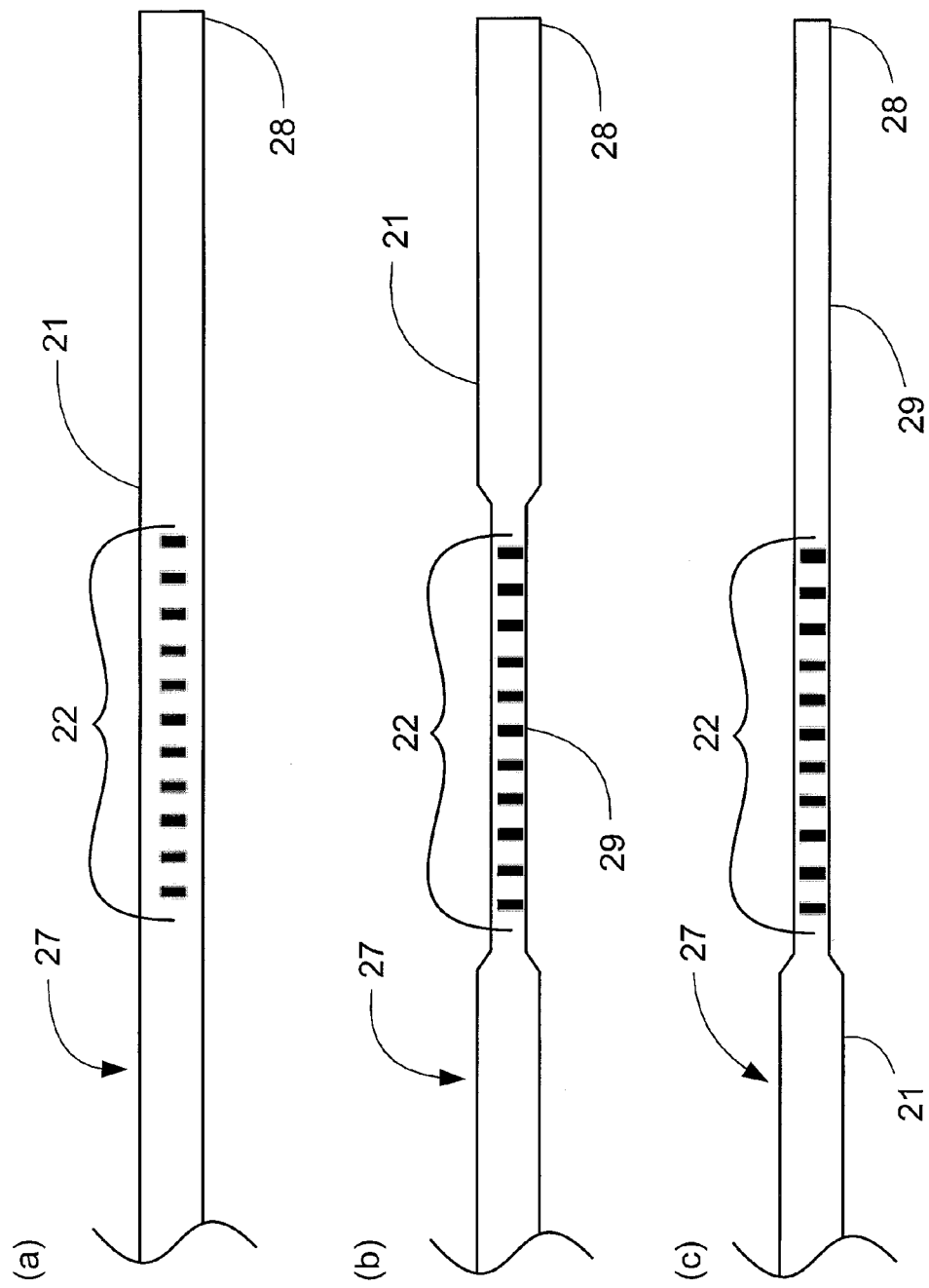
FIG. 4(a) is a side view of an optical fibre having a section with an in-fibre Bragg grating along a distal portion, according to an exemplary embodiment of the present invention, (b) is a side view of a distal portion of an optical fibre having a narrowed-diameter section with an in-fibre Bragg grating according to an exemplary embodiment, and (c) is a side view of a distal portion of an optical fibre having a narrowed-diameter section with an in-fibre Bragg grating, wherein the narrowed section extends to the distal terminal end of the optical fibre, according to an exemplary embodiment.

A narrowed-diameter section having the design shown in FIG. 4(b) was etched into a single mode optical fibre (SMF-28, Corning Life Sciences) with the following process. First, the polyimide jacket protecting the cladding 25 (FIG. 3) of the optical fibre was stripped by submerging the optical fibre in a mixture of 25% (by volume) hydrogen peroxide and 75% sulfuric acid, for 4 minutes. The length of optical fibre stripped of its polyimide jacket was approximately 200% of the combined length of the distal segment and the adjacent segment extending from the distal end of the optical fibre toward the narrowed section. The length of optical fibre extending from the distal end toward narrowed section was re-jacketed to prevent hydrofluoric acid etching along this length, by applying a polyethylene glue to the optical fibre. The length of the optical fibre stripped of its polyimide jacket was submerged into hydrofluoric acid (48%) to etch the silica glass thereby producing a reduced diameter. The rate of optical fibre diameter reduction during hydrofluoric acid etching was determined to be about 3.4 µm of silica glass per minute. The selected diameter of the etched section was achieved by etching for a pre-determined period calculated in reference to the known rate of diameter reduction of the polyimide material in the hydrofluoric acid bath (i.e. 3.4 µm/min). The etching process was stopped by removing the optical fibre from the hydrofluoric acid bath and then immediately submerging it into a saturated aqueous solution of calcium hydroxide for ten minutes. Those skilled in the art will understand the methods previously disclosed for assessing FBG performance are not compromised by acid etching to diameters as small as 25 µm.

A FBG 22 (Blue Road Research, Greshem, Oreg., USA) was UV-written into optical fibre and then a section was narrowed. The optical fibre having the narrowed-diameter with the FBG was then assembled into another exemplary pressure sensing device using the same types of materials listed in Example 1. The hypodermic tubing comprising the housing 20 had a Young's modulus value of 190 kpa with a Poisson ratio of 0.28. The Young's modulus value of the optical fibre was 70 kpa with a Poisson ratio of 0.17. The Young's modulus value of the silicone sealant was 372 kPa with a Poisson ratio of 0.49.

Figure 5:
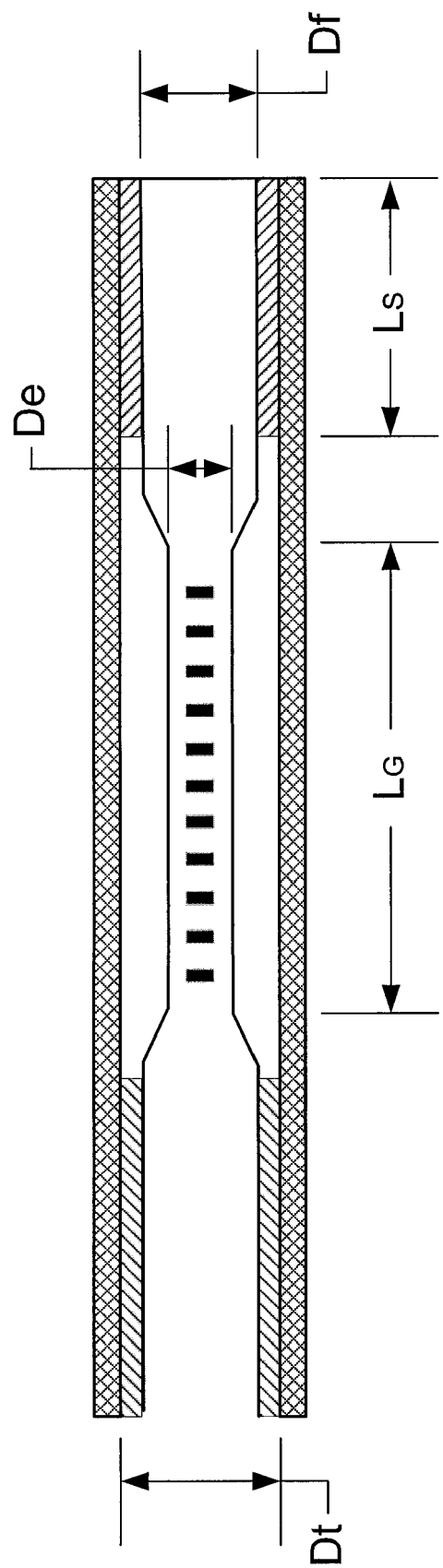
FIG. 5 is a cross-sectional side view of an exemplary probe comprising an optical fibre having a narrowed section with a FBG, showing locations on and along the probe where measurements were taken for calculations of the magnitudes of strains and pressures detected.

The following measurements were recorded and incorporated into the finite element model described in more detail in Example 3. The length of the optical fibre section with the FBG was termed "$L_G$" (FIG. 5). The length of the second annular seal 24 which is affected by a physical parameter acting on the resilient diaphragm 27 was termed "$L_S$" (FIG. 5). The inner diameter of the housing 20 was termed "Dt", while the diameter of the optical fibre was termed "Df". The diameter of the narrowed section with the FBG was termed "De" (FIG. 5). Strains in the FBG induced changes in its Bragg wavelength, $\lambda_B$, the characteristic wavelength of light that is reflected from a FBG. The reduction in the cross-sectional area between the distal portion of the optical fibre and the adjacent segment where the optical fibre diameter transitions from Df to De, amplified the strains along the adjacent segment relative to the strains in the distal segment, where the diameter is Df. Those skilled in these arts would understand that an etching strategy shown in FIG. 4(c) would also amplify the strains along a distal section 29 of the optical fibre adjacent to the distal terminal and also, on the FBG in the narrowed section of the optical fibre.

Example 3

Figure 6:
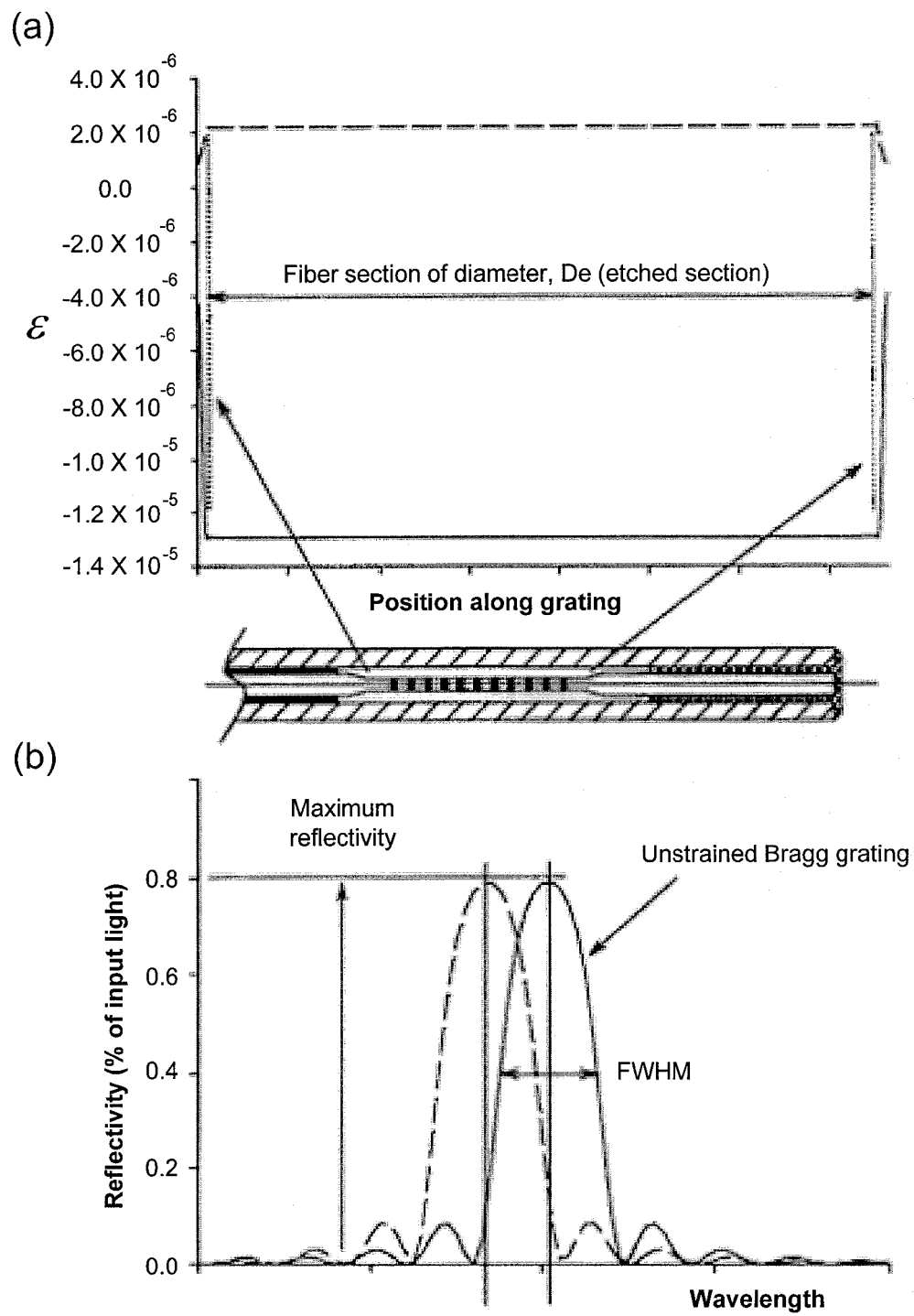
FIG. 6(a) is a graph illustrating strain versus axial position along exemplary grating of the present invention, and (b) is a graph illustrating uniform strains along the FBG showing shifts in the Bragg wavelength.

Pressure-induced strains within the etched FBG sensor produced in Example 2 and shown in FIG. 5 were calculated as a function of applied hydrostatic pressure using a commercially available suite of finite-element structural analysis codes (ANSYS® version 11; ANSYS is a registered trademark of SAS IP Inc., Cheyenne Wyo., USA). FIG. 6 is a schematic view showing the model geometry as well as the displacement and pressure boundary conditions. Pressures were applied to the entire sensor length while the displacement constraints were applied to the distal end of probe.

Another exemplary embodiment was produced with similar dimensions for embodiment shown in FIG. 5, i.e., De=65 µm, Df=125 µm, Dt=200 µm (Dt is the inside diameter of the housing), LG=15 mm and Ls=1.4 mm. The outside diameter of the hypodermic tube was 400 µm. Applied pressures were modeled from 0 kPa to 250 kPa to ensure that the strains experienced by the FBG would result in Bragg wavelength variations of greater magnitude than the wavelength measurement accuracy of the interferometer (i.e. ±1.5 pm) (Wavemeter model WA-7000, Burleigh Instruments Inc., Victor, N.Y., USA). However, in the calibration studies using the fixed filter demodulation technique, applied pressures were limited to the ranges from about 0 kPa to about 14 kPa associated with medical applications such as cerebrospinal fluid (CSF), muscle compartments, blood-vessels and across arterial stents.

The pressure induced strains for the first embodiment were first obtained by solving a model meshed using PLANE182 (tetrahedron) elements for 250 kPa applied pressure to ensure model deflections were maximum. Mesh refinements were subsequently performed until the relative difference in the predicted strain (along the FBG) between subsequent models was less than about 1%. Once the mesh convergence was established, the element type was changed to PLANE42 (triangle) elements to verify element-type independence of the solution by ensuring the relative difference in the average predicted strain along the FBG was less than about 1%.

The effects of varying the size of the design features (FIGS. 4(a)-(c)) on etched FBG sensor sensitivity were also calculated. Starting with the first embodiment already described, the design features were incrementally varied (one at a time, and holding the size of all other features constant) over a range of values (Table 1) that could be achieved using the sensor construction methods currently known in the art. At each increment, the effect (increase or decrease) on sensor sensitivity was assessed by calculating the strains along the etched optical fibre section with a FBG. For example, if the strains in the FBG were greater in magnitude (when compared to the first embodiment), the sensor sensitivity was increased because the magnitude of Bragg wavelength shift was directly proportional to strain magnitude. In some instances, variations of design parameters necessitated minor finite-element mesh modifications. Finite-element models were also used to verify the sensor performance of two more embodiments that were constructed as illustrated in Table 2 (see Example 7).

TABLE 1

Minimum size, size increment value, and maximum size of design features modeled in finite-element study. Overall sensor length was constant at 2 cm.

| Design feature | Minimum size (μm unless noted) | Increment (μm unless noted) | Maximum size (μm unless noted) |
| --- | --- | --- | --- |
| De | 25 | 20 | 125 |
| Df | 65 | 20 | 165 |
| Dt | 139.7 | * | 280 |
| LG | 2.5 mm | 2.5 mm | 15 mm |
| Ls | 0.25 mm | ** | 2 mm |

\* Specified for commercially available hypodermic tube sizes
\*\* Variable increment used Example 4

The data in FIG. 6(a) show that pressures applied to the sensing region (FIG. 5) caused uniform compressive strains along the z-axis of the FBG. Uniform axial strain, $\epsilon_z$, and transverse strain, $\epsilon_x$, and $\epsilon_y$, were shown to result in predictable variations in the Bragg wavelength, $\lambda_B$, while the full-width at half maximum (FWHM) and the maximum reflectivity remained constant (FIG. 6(b)). Since the strains were uniform along the length of the grating, variations in the Bragg wavelength were predictable based on the assumption that the length of the grating considered is considered to be a "unit", and a single equation known in the prior art was used to predict wavelength, FWHM and peak reflectivity variations. Conversely, FBG sensors having non-uniform strains along the etched FBG require more complicated, strain-optic formulations for prediction of wavelength, FWHM and peak reflectivity variations.

Shifts in the Bragg wavelength, denoted by $\Delta\lambda_B$, can be predicted from the strain along the grating using the following closed-form relation that has been extensively discussed/derived in the prior art.

$$\frac{\Delta\lambda_B}{\lambda_B} = \varepsilon_z - \frac{n_0^2}{2}\left[p_{zz}\varepsilon_z + \frac{1}{2}(p_{zx} + p_{zz})(\varepsilon_x + \varepsilon_y)\right] \quad (1)$$

where $n_0$ is the nominal index of refraction of the fibre specified in the model at 1.44 and $p_{zz}$, $p_{zx}=p_{zy}$, are elements of the photo-elastic tensor specified at 0.252 and 0.113, respectively. The strains, $\epsilon_z$, $\epsilon_x$, $\epsilon_y$, along the core of the fibre were obtained from the results of the finite-element models and were used in Equation (1) to determine the shift in the Bragg wavelength, $\Delta\lambda_B$, as a function of applied hydrostatic pressure.

Example 5

Since FBG sensor sensitivity is usually reported in terms of wavelength shift versus applied pressure, calibration data were collected in the form of Bragg wavelength variations as functions of applied pressures. Experimental data in the form of Bragg wavelength versus applied hydrostatic pressure, ranging from 0 kPa to 250 kPa, were collected using a purpose-built calibration apparatus to assess the FBG sensor finite-element/strain-optic model predicted sensor sensitivity.

The calibration system included a broad C-band light source, a bi-directional 3 dB optical coupler, a Wavemeter, a purpose built pressure vessel and a reference pressure transducer, and was suitably configured.

The sensing device was inserted into a pressure vessel and sealed via a bulkhead fitting. Pressure was manually varied from 0 kPa to 250 kPa to 0 kPa with a manual hydraulic pump while Bragg wavelength variations were recorded with the Wavemeter. This procedure was repeated three times for each sensing device that was tested.

The optical FBG interrogation equipment was commissioned and designed to convert changes in Bragg wavelength to analogue voltage. The fixed filter demodulation technique enabled direct calibration of the FBG sensor in reference to analogue voltage and pressure. This demodulation technique and the calibration apparatus were used to calibrate the FBG sensor from 0 kPa to approximately 13 kPa. Analogue voltage versus applied pressure was acquired at 60 Hz and the average sensitivity of the sensor was calculated, using linear-regression from 3 calibration datasets acquired using hardware and software implemented in LabView® (LabView is a registered trademark of National Instruments Corporation, Austin Tex., USA).

The first embodiment (De=65 μm, Dt=200 μm, housing outside diameter 400 μm) satisfied all convergence criteria with an axisymmetric mesh of 28,000 PLANE182 elements and with nominal distance of $1.25\times10^{-5}$ m between element nodes. This mesh also satisfied all ANSYS® aspect ratio criteria before the model was solved, and after the model was solved and the mesh had deflected. The relative difference in the predicted strains using PLANE182 (tetrahedron) elements and PLANE42 (triangle) elements was 0.08% ($\epsilon_z$) and 0.00% ($\epsilon_x,\epsilon_y$) and satisfied the element independence criteria.

Figure 7:
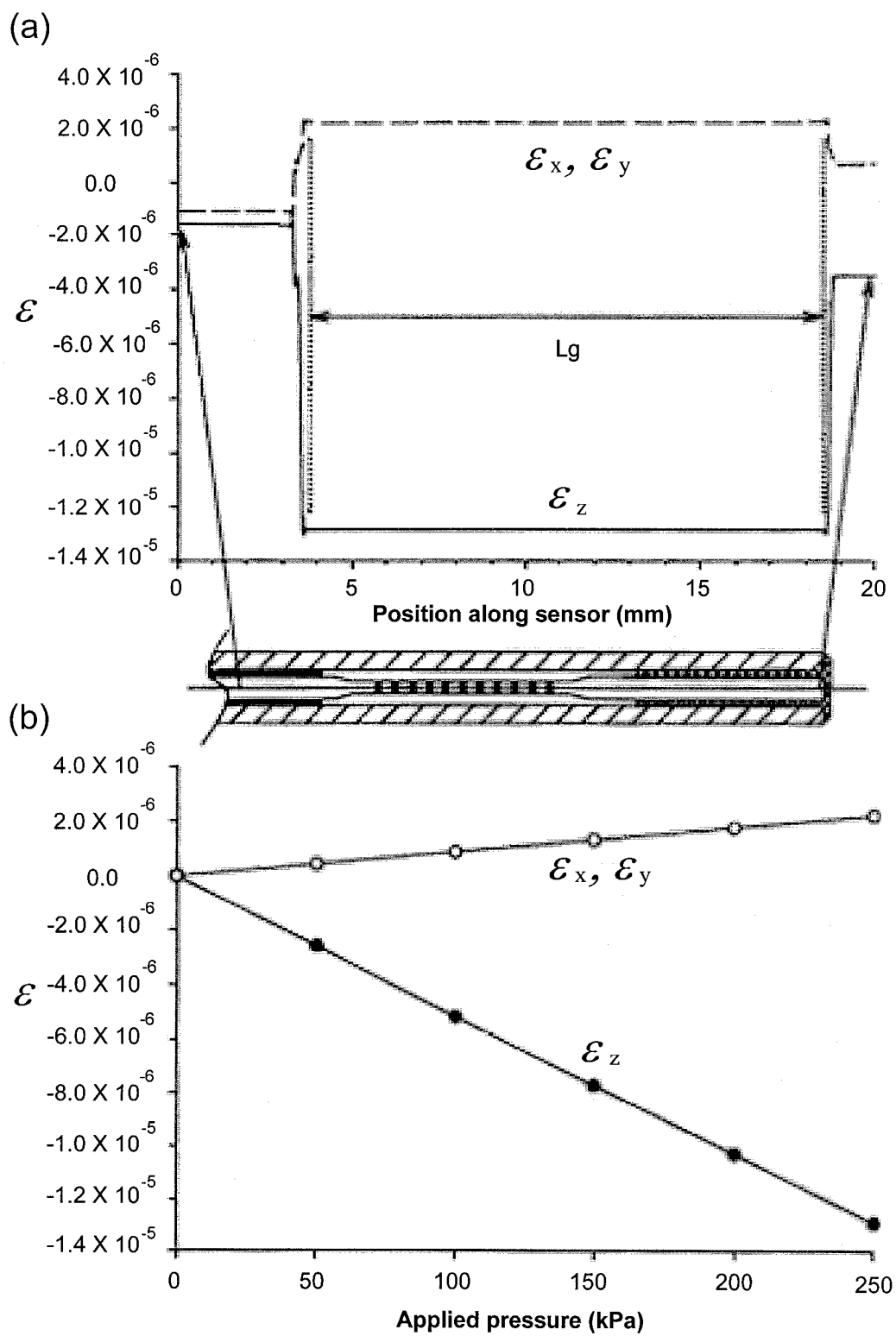
FIG. 7(a) is a graph illustrating strain data, and (b) is a graph illustrating the magnitude of strains along the etched region of a fibre for a range of applied pressures.

FIG. 7(a) shows the strains along the core of the optical fibre (x=0, y=0) in the first embodiment with 250 kPa applied pressure. Progressing from the proximal end 20 to the distal end 188, both axial and transverse strains had constant magnitudes along Ls until the cross-sectional diameter of the fibre transitions from Df to De. Along the length of the optical fibre that was etched (which contained the FBG of length LG), the strains were amplified relative to those encountered along the fibre length Ls as evidenced by the abrupt increase in strain magnitude at about 18.6 mm. Progressing towards the length of optical fibre supported by the epoxy, the strain magnitudes diminished about where the fibre diameter increased from De to Df again (position of 3.6 about mm). The variations in strains shown in FIG. 7(a) were typical of all the sensor embodiments modeled. FIG. 7(b) shows that both the axial and transverse strain magnitudes along LG were linear functions ($r^2$=1.00) of the applied pressure on the sensor. The plotted transverse strains had magnitudes equal to the product of the Poisson ratio of the fibre and the axial strain (i.e. they were due to the transverse expansion of the optical fibre resulting from axial compression). The predicted variation in the strains shown in FIG. 7(b) will result in a linear variation of the Bragg wavelength with pressure.

Experiments for the exemplary invention verified that the strains were uniform over the entire cross-section of the core of the single-mode optical fibre (diameter 9 μm) that contains the FBG (over LG, and 0<x, y<9 μm). The average difference between the strains predicted along the longitudinal axis (over LG, and x=0, y=0) and the outside diameter of the core was less than 0.01% of the strain magnitude over LG, for both axial and transverse strains.

Example 6

Figure 8:
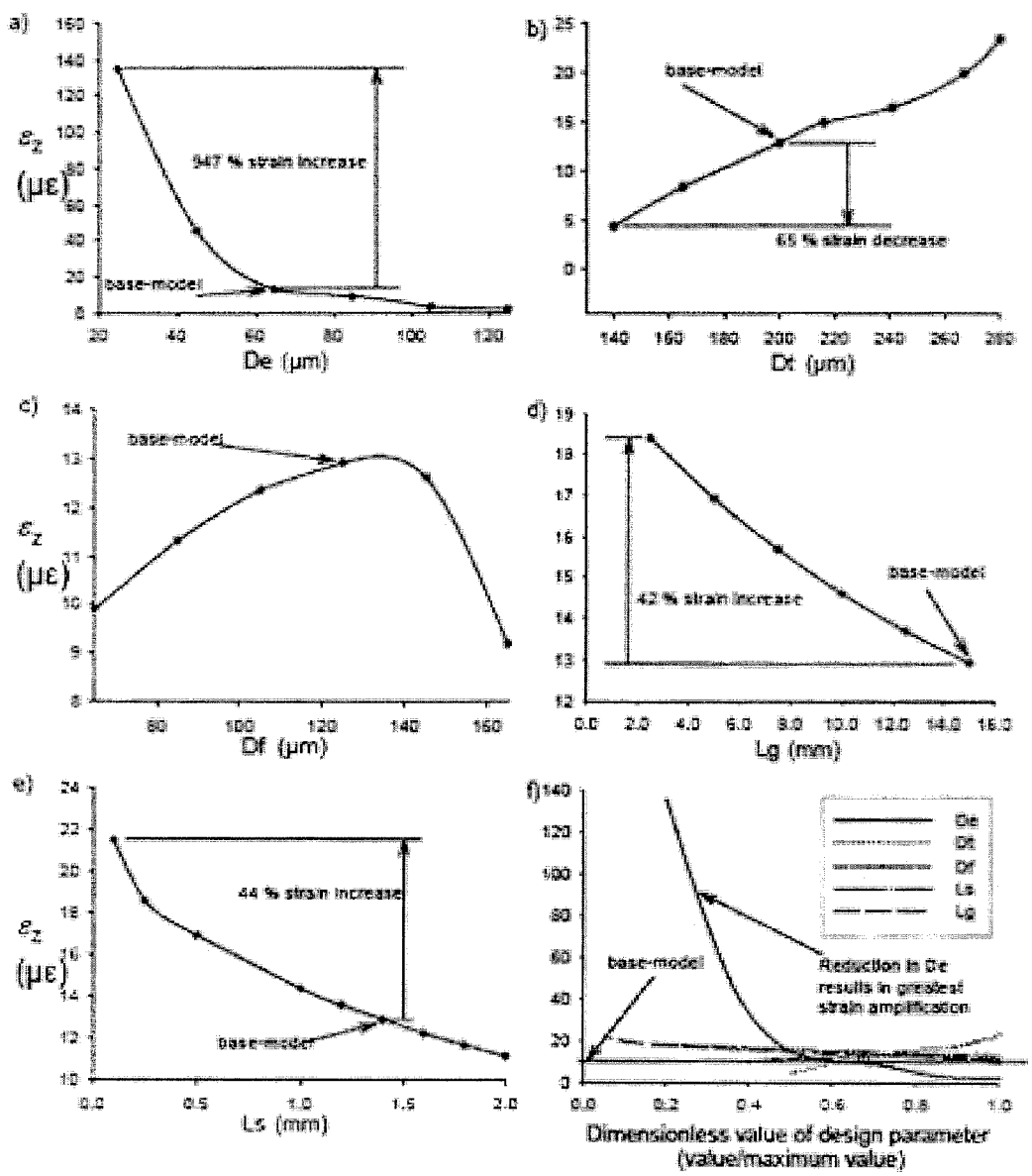
FIG. 8(a) is a graph illustrating axial strain along FBG with varying sizes of etched diameters (De), (b) is a graph illustrating axial strain along FBG with variations in the size of the inside diameter of the housing (Dt), (c) is a graph illustrating axial strain along FBG for varying sizes of the distal segment diameter (Df), (d) a graph illustrating an axial strain along the FBG for varying lengths of the etched portion of the FBG (LG), (e) is a graph illustrating axial strain along the FBG for varying lengths of the silicon (Ls), and (f) is a graph illustrating variations of axial strain for all design parameters (De, Dt, Df, LG, Ls) plotted against the non-dimensional values of the parameter values.

FIG. 8 shows the effect (increase/decrease in axial strain along grating) of varying the size of the design features shown in FIG. 5. The results shown were obtained from the finite-element study wherein the initial values of all design parameters matched those of the first embodiment. The sizes of the design features were varied incrementally one at a time, while maintaining the sizes of the other features constant. To avoid plotting negative strain magnitudes, all strains were plotted as positive quantities.

The principal design objectives of the sensor development discussed in this example were to increase sensitivities to applied pressure while reducing the major diameter of the sensor. The latter objective was achieved by constructing sensors with reduced hypodermic tube diameters. As shown in FIG. 8(b), reducing the diameter Dt from 200 μm to 139.7 μm resulted in 65% decrease (normalized to strain of first embodiment) in the axial strain. Conversely, reduction in overall sensor length was predicted to cause increases in the axial strain, shown by FIGS. 8(d) and (e) for LG and Ls, respectively. Reducing the length of the FBG LG, from 15 mm to 2.5 mm resulted in a 42% increase in the axial strain. Furthermore, reducing the length of the silicone Ls, from 1.4 mm to 0.25 mm resulted in a 44% increase in the axial strain (FIG. 8(e)).

Reducing Df to equal De enabled development of sensors with smaller major diameters. The fibre segments LG and Ls of such sensors would have identical diameters, thereby allowing the use of smaller hypodermic tubes than would otherwise be possible when Df is greater than De. As shown in FIG. 8(c), when Df and De are equal, there is only a 23% decrease in the axial strain along the grating (relative to the first embodiment). Furthermore, reductions in De resulted in the most drastic increases in the axial strain along the grating (FIG. 8(a)). Reducing the etched diameter from 65 μm to 25 μm resulted in a strain magnitude increase of about 1000% which was far greater than any reduction in strain that resulted from varying other design parameters (FIG. 8(f)).

Example 7

Figure 9:
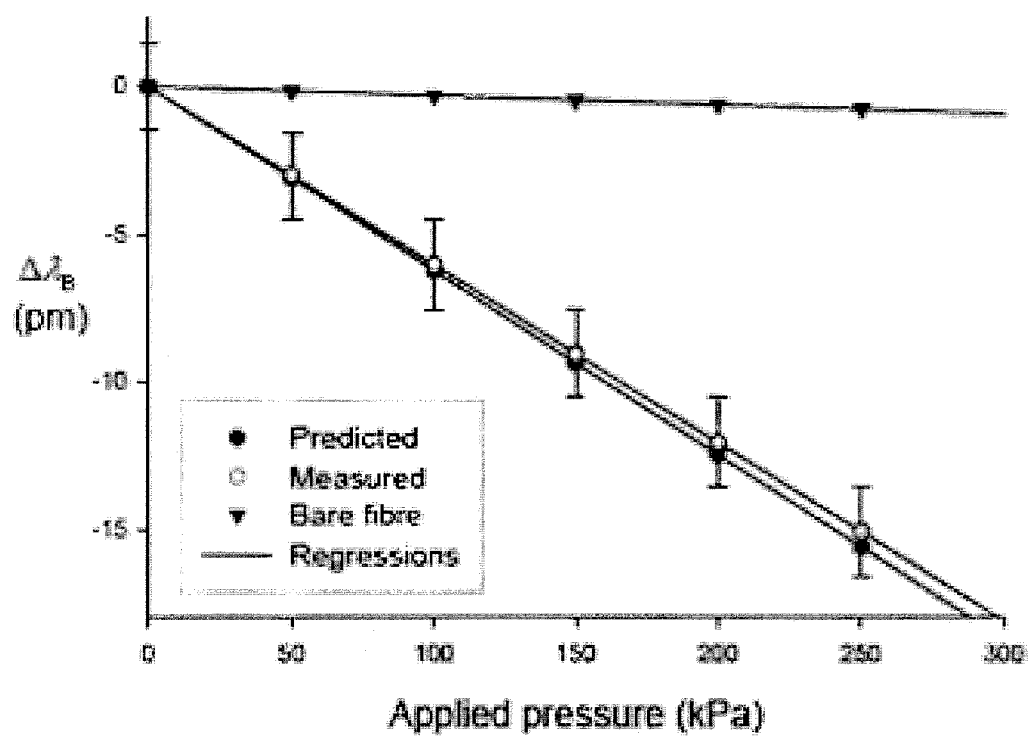
FIG. 9 is a graph showing the predicted and experimentally measured change in Bragg wavelength versus applied pressure.

To verify the results obtained from the finite-element study, the pressure sensitivities ($\Delta\lambda_B/\Delta P$) of the first embodiment and two additional embodiments were calculated using the predicted strains and the strain-optic model. FIG. 9 shows the finite-element/strain-optic-predicted and experimentally measured variations in the Bragg wavelength, $\Delta\lambda_B$, versus applied pressure, $\Delta P$ for the first embodiment. Vertical error bars (±1.5 pm) correspond to the absolute accuracy of the Wavemeter. Horizontal error bars (±0.034 kPa) are not visible at scale shown but correspond to the accuracy of the reference transducer. Data points were plotted based on published sensitivity of bare-FBG pressure sensor to show increases in sensitivity scales. As shown in Table 2, the predicted and experimentally measured sensitivities matched to within 3.5%. The sensitivity of the first embodiment was approximately 20 times greater than that of a bare FBG (FIG. 9). Table 2 shows the predicted and measured pressure sensitivities of the remaining two etched FBG sensor embodiments. The predicted and measured sensitivities matched extremely well with relative differences of 7.01% and 2.04% for embodiment 2 and 3, respectively.

TABLE 2

Predicted and experimentally measured pressure sensitivities for the three FBG sensor embodiments. Design features sizes are specified for each embodiment. Pressure sensitivities (pm/MPa) and correlation coefficients ($r^2$) obtained from regression calculations.

| Embodiment | Design feature sizes | Predicted pressure sensitivity (pm/MPa) ($r^2$)+ | Experimentally measured pressure sensitivity (pm/MPa) ($r^2$)+ |
|---|---|---|---|
| (1) 400 μm outside diameter | De = 65 μm<br>Df = 125 μm<br>Dt = 200 μm<br>LG = 15 mm<br>Ls = 1.4 mm | −62.4<br>1.00 | −60.3<br>0.99 |
| (2) 356 μm outside diameter | De = 37 μm<br>Df = 125 μm<br>Dt = 178 μm<br>LG = 15 mm<br>Ls = 1.4 mm | −68.7<br>1.00 | −64.2<br>0.99 |
| (3) 200 μm outside diameter | De = 25 μm<br>Df = 125 μm<br>Dt = 165 μm<br>LG = 15 mm<br>Ls = 1.4 mm | −59.9<br>1.00 | −58.7<br>0.99 |

Notes:
+correlation coefficients obtained from regression calculations

Example 8

Fixed filter demodulation was used to collect calibration data in the form of voltages as a function of applied pressures. Fixed filter demodulation is known to provide the highest resolution in pressure measurements.

Figure 10:
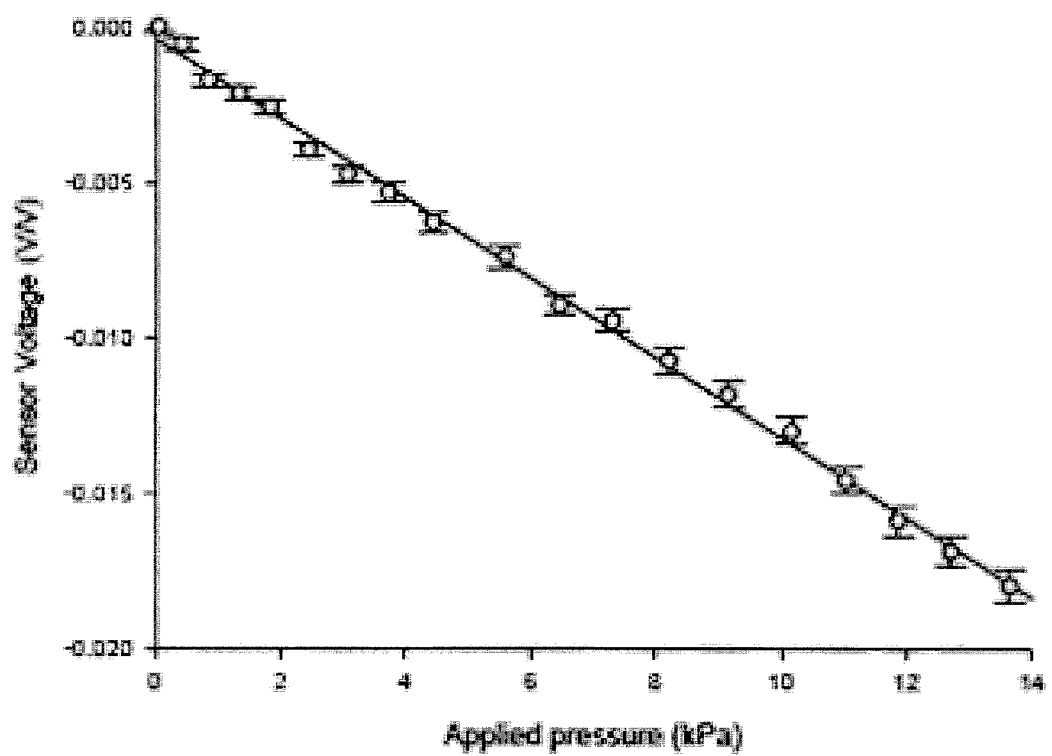
FIG. 10 is a graph showing the effects of variations in voltage versus applied pressure.

Calibration results obtained using the fixed filter demodulation technique are shown in FIG. 10, and demonstrate the sensor's ability to measure pressure variations of the order kPa. The average regression-calculated slope from the three calibration data sets was 1.43±0.023 mV/V/kPa (mean±standard deviation). Vertical error bars obtained from regression, horizontal error bars (±0.034 kPa) not visible at scale shown, but correspond to accuracy of reference transducer. The regression-calculated vertical error bars (FIG. 10) increased in size as applied pressure increased based on the uncertainty in the regression-calculated slope (i.e. 0.023 mV/V/kPa). The error bars have a minimum value of ±0.20 mV/V at 0 kPa which corresponds to the standard deviation in the regression calculated vertical-intercept, and a maximum value of ±0.51 mV/V at 13.64 kPa. The uncertainty in pressure measurement is estimated as the maximum error (i.e. ±0.51 mV/V) divided by the regression-calculated slope (i.e. 1.43 mV/V/kPa) and has a value of ±0.36 kPa.

When the 200-μm embodiment was correlated with fixed filter demodulation, the combined contributions of increased sensor sensitivity and increased resolution demonstrated a sensing system with resolution appropriate for pressure variations of the order kPa (FIG. 10). The detection range was about 13 kPa to about 0.5 MPa and the resolution (limit of detection) was 0.8 kPa.

Example 9

Figure 11:
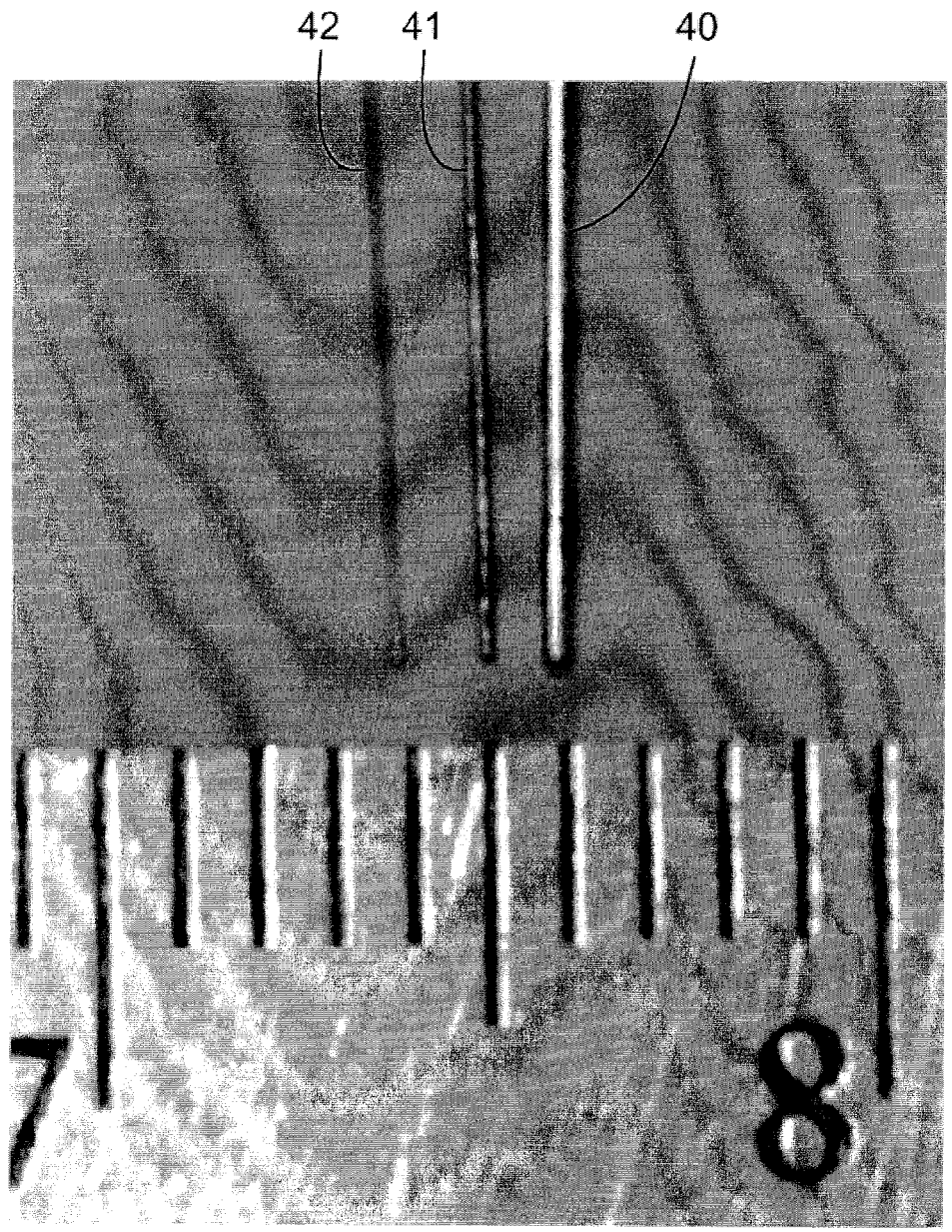
FIG. 11 is a photographic image showing the relative diameters of various exemplary embodiments of the present invention

FIG. 11 is an image showing the relative diameters of a first optical fibre provided with an FBGs and having a 400-μm outside diameter 40, a second optical fibre provided with FBGs and having a 200-μm outside diameter 41, and of the bare single-mode fibre having a nominal 125-μm outside diameter 42. A pressure sensor with a probe housing the second optical fibre 41 simultaneously achieved increased pressure sensitivity, reduced major diameter and high special resolution. This pressure sensor had a sensitivity of ($\lambda_B$/P) of 58.7 pm MPa$^{-1}$, which was approximately 19 times greater than that of a pressure sensor configured with the bare single-mode fibre 42 (i.e. 3.1 pm MPa$^{-1}$) and approximately 3 times greater than that of a pressure sensor configured with an optical fibre 40 having an outside diameter of 400 μm (i.e. 20 pm MPa$^{-1}$). Furthermore, the sensing region of the pressure sensor configured with the 200-μm diameter optical fibre 41 was only 0.02 mm$^2$.

This exemplary FBG sensor design simultaneously achieved mechanical amplification of pressure sensitivity as well as reduction in sensor major diameter and high spatial resolution by limiting the sensing region to the probe tip.

The invention claimed is:

1. A sensing device for detecting a physical parameter, the sensing device comprising:
   a probe comprising a housing for sealably mounting a sensor therethrough, the probe having a distal portion configured for detecting a physical parameter and a proximal portion communicable with a signal processing device;
   aسensor comprising an optical fibre having a uniform diameter extending therealong with a distal portion and a proximal portion, the optical fibre having a section extending along the distal portion wherein the fibre is provided with an fibre Bragg grating;
   a first seal interposed therebetween and therealong the proximal portion of the optical fibre and the proximal portion of the housing, said first seal extendable to about a proximal end of the optical fibre section provided with the fibre Bragg grating;
   a second seal interposed therebetween and therealong the distal portion of the optical fibre and the distal portion of the housing, said second seal extendable to about a distal end of the optical fibre section provided with the fibre Bragg grating; and
   a holder configured for releasibly engaging a proximal portion of the probe whereby a distal portion of the probe extends from the holder.

2. A sensing device according to claim 1, wherein the physical parameter is a pressure.

3. A sensing device according to claim 1, wherein a terminal end of the distal portion of the probe is provided with a diaphragm engaged therewith, whereby the diaphragm is communicable with a distal end of the optical fibre.

4. A sensing device according to claim 1, wherein the distal end of the optical fibre section provided with the fibre Bragg grating is adjacent to the terminal end of the distal portion of the probe.

5. A sensing device according to claim 1, wherein the sensing device is communicable with the signal processing device by one of an interconnected signal-transmission cable and wireless transmission.

6. A sensing device according to claim 5, wherein the sensing device additionally comprises a fibre Bragg grating interrogation system.

7. A sensing device according to claim 6, wherein the sensing device is communicable with a data acquisition system.

8. A sensing device according to claim 1, wherein the diameter of the optical fibre is at most about 400 microns.

9. A sensing device according to claim 1, wherein the pressure detection sensitivity is at least about 75 pm/MPa.

10. A sensing device according to claim 8, wherein the optical fibre comprises:
    a section extending along the distal portion wherein the fibre diameter is narrowed, the narrowed-diameter section provided with said fibre Bragg grating;
    the first seal extendable to about a proximal end of the optical fibre section having the narrowed fibre diameter provided with the fibre Bragg grating; and
    the second seal extendable to about the distal end of the optical fibre section having the narrowed fibre diameter provided with the fibre Bragg grating.

11. A sensing device according to claim 10, wherein the diameter of the narrowed section of the optical fibre is narrowed by about 1% to about 95%.

12. A sensing device for detecting a physical parameter, the sensing device comprising:
    a probe comprising a housing for sealably mounting a sensor therethrough, the probe having a distal portion configured for detecting a physical parameter and a proximal portion communicable with a signal processing device;
    a sensor comprising an optical fibre having a uniform diameter extending therealong with a distal portion and a proximal portion, the optical fibre having a section extending along the distal portion wherein the fibre diameter is narrowed, the narrowed-diameter section provided with a fibre Bragg grating;
    a first seal interposed therebetween and therealong the proximal portion of the optical fibre and the proximal portion of the housing, said first seal extendable to about a proximal end of the optical fibre section having the narrowed fibre diameter provided with the fibre Bragg grating;
    a second seal interposed therebetween and therealong the distal portion of the optical fibre and the distal portion of the housing, said second seal extendable to about a distal end of the optical fibre section having the narrowed fibre diameter provided with the fibre Bragg grating; and a holder configured for releasibly engaging a proximal portion of the probe whereby a distal portion of the probe extends from the holder.

13. A sensing device according to claim 12, wherein the physical parameter is a pressure.

14. A sensing device according to claim 12, wherein a terminal end of the distal portion of the probe is provided with a diaphragm engaged therewith, whereby the diaphragm is communicable with a distal end of the optical fibre.

15. A sensing device according to claim 12, wherein the distal end of the optical fibre section provided with the fibre Bragg grating is adjacent to the terminal end of the distal portion of the probe.

16. A sensing device according to claim 12, wherein the sensing device is communicable with the signal processing device by one of an interconnected signal-transmission cable and wireless transmission.

17. A sensing device according to claim 16, wherein the sensing device additionally comprises a fibre Bragg grating interrogation system.

18. A sensing device according to claim 17, wherein the sensing device is communicable with a data acquisition system.

19. A sensing device according to claim 12, wherein the diameter of the optical fibre is at most about 400 microns.

20. A sensing device according to claim 12, wherein the pressure detection sensitivity is at least about 75 pm/MPa.

21. A method for producing a sensing device, the method comprising:

selecting an optical fibre having a uniform outer diameter of at most about 400 microns, and selecting therealong a proximal portion and a distal portion;

selecting a section of the optical fibre approximate the distal portion of said optical fibre;

controllably narrowing the diameter of the selected section by about 1% to about 95%;

inserting the optical fibre therethrough a probe, said probe comprising a housing having a distal portion and a proximal portion whereby distal portion of the optical fibre with the narrowed-diameter section is juxtaposed the distal portion of the probe;

interposing a first seal therebetween and therealong the proximal portion of the optical fibre and the proximal portion of the housing, said first seal extendable to about a proximal end of the optical fibre having the narrowed-diameter section provided with the fibre Bragg grating;

interposing a second seal therebetween and therealong the distal portion of the optical fibre and the distal portion of the housing, said second seal extendable to about a distall end of the optical fibre having the narrowed-diameter section provided with the fibre Bragg grating; and mounting the proximal portion of the probe into a holder.

22. A method according to claim 21, additionally providing a fibre Bragg grating interrogation system communicable with the proximal portion of the probe.

* * * * *